Figure 1:
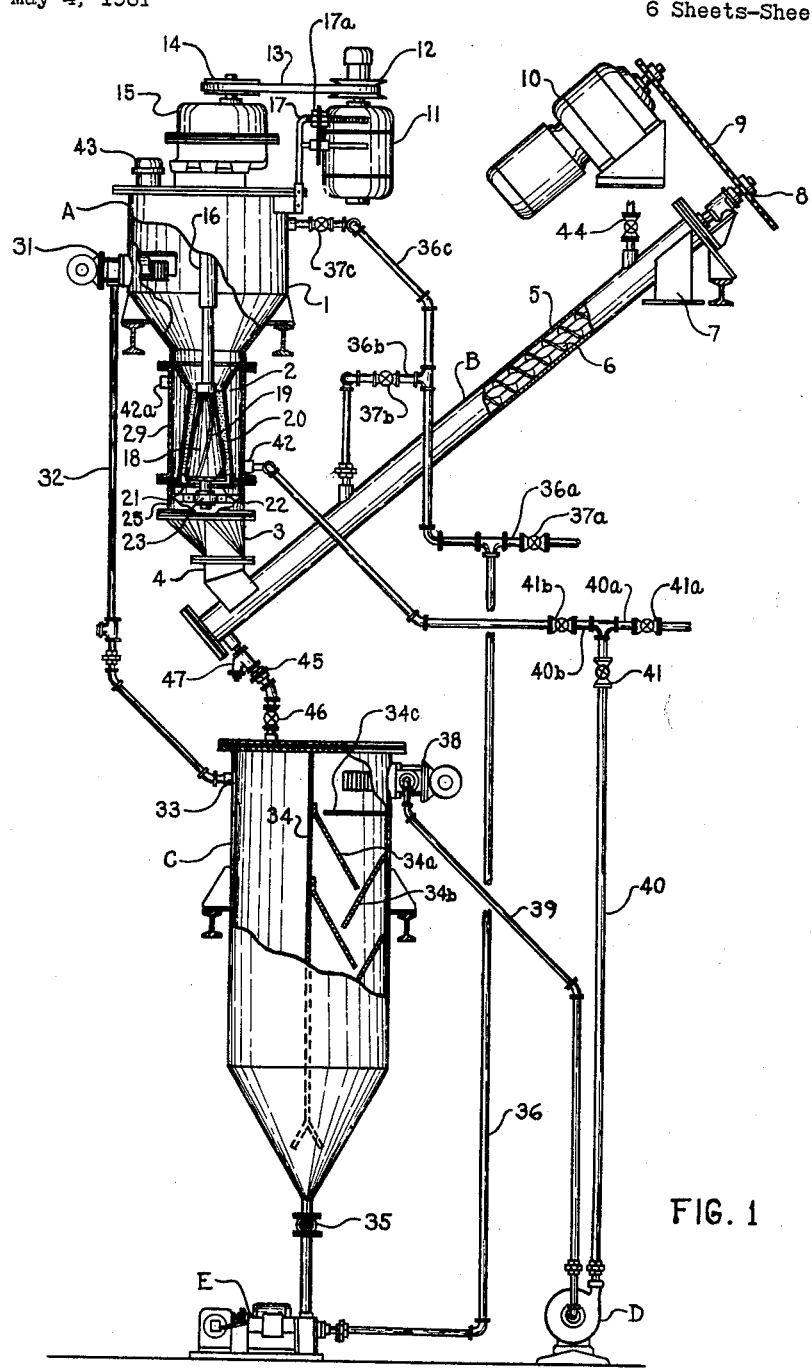

Jan. 12, 1965 T. B. WAYNE 3,165,134
APPARATUS FOR MILLING RICE AND THE LIKE
Filed May 4, 1961 6 Sheets-Sheet 1

INVENTOR
TRUMAN B. WAYNE
BY
ATTORNEY

INVENTOR
TRUMAN B. WAYNE
BY

ATTORNEY

Jan. 12, 1965     T. B. WAYNE     3,165,134
APPARATUS FOR MILLING RICE AND THE LIKE
Filed May 4, 1961     6 Sheets-Sheet 3

INVENTOR
TRUMAN B. WAYNE
BY
ATTORNEY

INVENTOR
TRUMAN B. WAYNE
BY

ATTORNEY

INVENTOR
TRUMAN B. WAYNE
BY
ATTORNEY

INVENTOR
TRUMAN B. WAYNE
BY

ATTORNEY

United States Patent Office 3,165,134
Patented Jan. 12, 1965

3,165,134
APPARATUS FOR MILLING RICE AND THE LIKE
Truman Benjamin Wayne, Houston, Tex., assignor to Food Engineering International, Inc., Houston, Tex., a corporation of Texas
Filed May 4, 1961, Ser. No. 107,728
4 Claims. (Cl. 146—279)

This invention relates to improvements in the milling of rice, and specifically to an improved apparatus for the removal of the bran coat from brown rice, which may be paddy or rough rice from which the hulls have been removed in a previous dehulling or shelling operation and separated by air currents and/or other means.

Rice with its hulls removed is called "brown rice" and contains its light-brown bran coat. This bran coat is made up of seven distinct layers which envelop the starchy interior of the kernel. Most of the six outer layers and part of the seventh, or aleurone layer, are removed in the succeeding operations. Since the aleurone cells are rich in protein, and this constituent is present also in the endosperm, only about 10 percent of the protein of the hulled rice is removed in the milling process. The oil, present largely in the germ, is removed to the extent of about 85 percent, and the proportion of mineral salts is reduced nearly 70 percent.

In the conventional rice milling process of commerce the rough, or paddy, rice is first cleaned of dirt, straw and other debris and is then sent to stone shellers which remove the hulls and most of the loosely adhering bran within the hull enclosure and surrounding the more adherent bran layers over the endosperm. The hulled, brown rice is then milled in machines having the misnomer of "hullers." Actually, these machines consist essentially of a horizontal, cylindrical shell having perforations against which the rice is rubbed by a rapidly revolving inner core having a ribbed surface. This surface grinding operation is carried out under time and feed rate conditions which will produce the desired degree of removal of the outer bran layers from the rice kernel. This rather severe milling process breaks a substantial proportion of the whole rice grains into two or more fragments, this breakage being due to a combination of effects such as impact, stresses and generated heat. The loss of whole, head rice kernels varies with the variety, state of curing, handling in the rice dryer and subsequent storage and the severity of milling. This breakage results in a serious economic loss, as broken rice brings only about half the price of the whole head rice.

The apparatus used in prior rice milling practices was developed many years ago and has continued in use since then without substantial modification. As used in rice mills, it is driven at constant speed and has a fixed clearance between the ribbed, horizontally placed rotor and the imperforate upper half; and of more importance, also the perforated screen lower half of the outer cylindrical enclosure for the said rotor. Arranged laterally on one side of the outer enclosure was a slot through which a bar was inserted and which by means of an adjusting screw and guide arrangement was held firmly while being moved inward or outward to adjust the clearance between the inner edge of this bar and the ribbed rotor. This provided a choking action at this point which increased the degree of agitation and friction between the rice kernels and the revolving and stationary machine parts when the aperture was restricted, and resulted in more severe milling and consequently an increase in the degree of breakage of the rice kernels. Further control of the degree of milling was also obtained independently or in combination with the effect of the choke bar by restricting the outlet through which the rice passed when leaving the machine. Since the rotor was equipped with positive acting lead-in flights at the feed end, any restriction of the flow of rice either within the annulus between the rotor and its casing by means of the choke bar, or by restriction of the outlet, greatly increased the pressure on the rice and resulted in increased scouring action, heat generation and breakage.

One of the objects of applicant's invention is to provide an improved milling apparatus which effectively removes the bran coat from brown rice while causing substantially less breakage of the whole rice kernels. This is accomplished to a substantial degree by eliminating the choke bar as the means of adjusting the clearance between the rotor and the cylindrical outer casing; also, by providing a means for the uniform adjustment of this clearance completely surrounding the rotor instead of using a choke bar restriction at one lateral point; the use of a perforated screen completely surrounding the rotor to provide an enlarged milling area which makes it possible to use many more but smaller diameter perforations to accomplish milling under less drastic pressure and scouring action; and the use of a variable speed positive withdrawal device to regulate the rate of withdrawal of the milled rice and thereby control its retention period in the milling zone.

Another objective of this invention is to provide a highly versatile apparatus for the milling of brown rice which is equally adaptable to dry milling as is currently practiced in commercial mills; also to dry milling of brown rice which has been treated with an agent to soften and/or loosen its bran coat, and to wet milling of brown rice in the presence of a substantially nonaqueous extractive solvent for its fatty constituents as disclosed in applicant's copending applications, Serial Numbers 43,-351, filed July 18, 1960, and 81,969, filed January 11, 1961, both of which are now abandoned.

Several embodiment of applicant's invention are contemplated, all of which, however, conform generically with the above described functions and operational descriptions.

Other objects and advantages of this invention will appear from the detailed description, taken in connection with the accompanying drawings; and it is to be understood that this invention is not so limited, except as specified in the appended claims.

Figure 2:
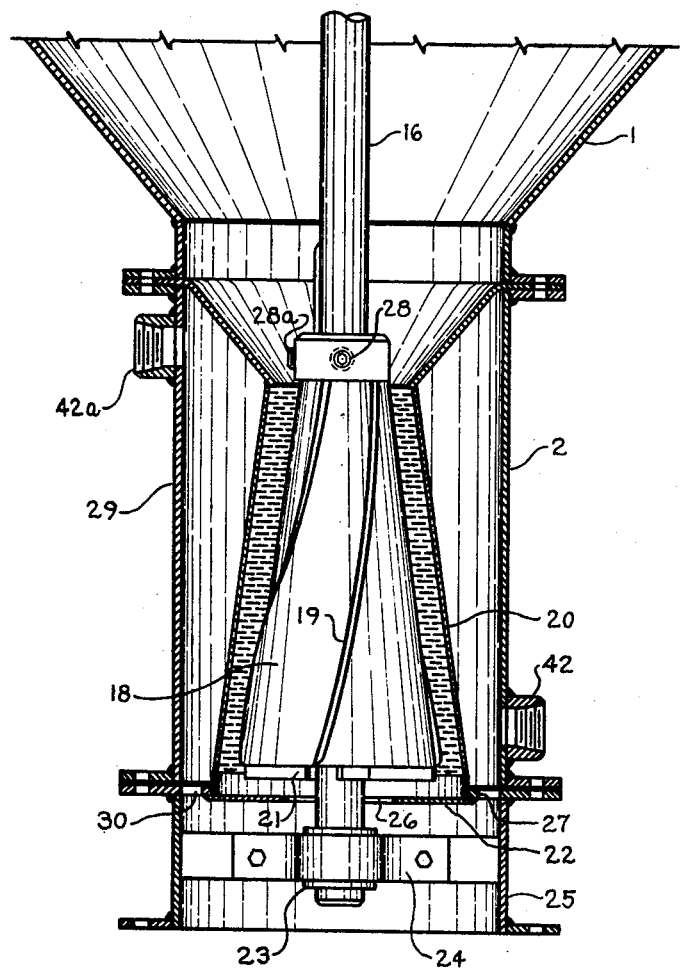
Figure 5:
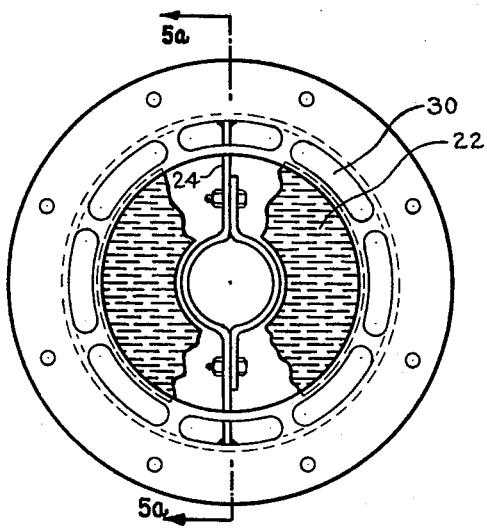
Figure 5A:
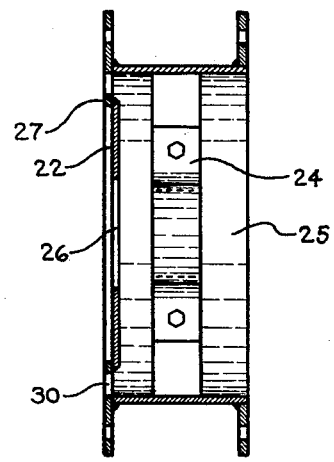
Figure 3:
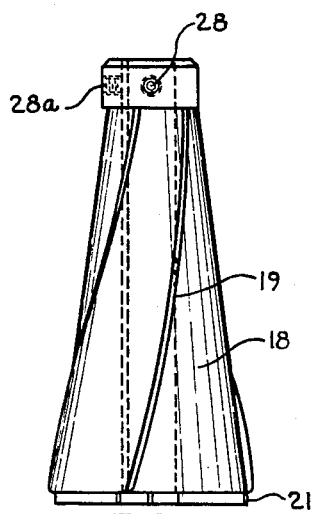
Figure 3A:
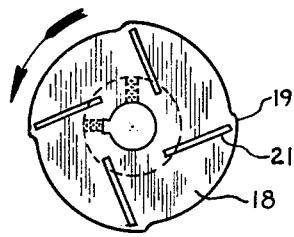
Figure 4:
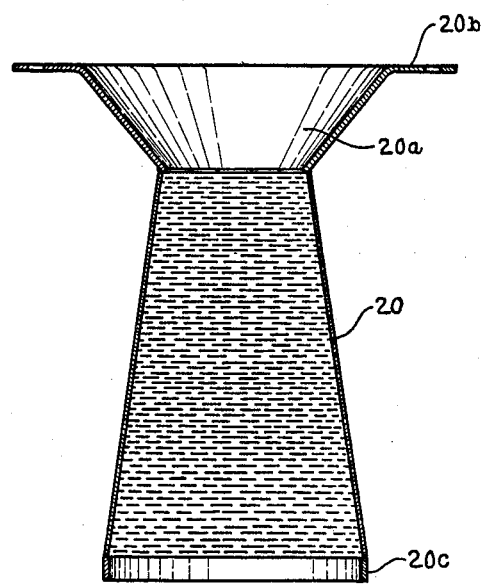
Figure 6A:
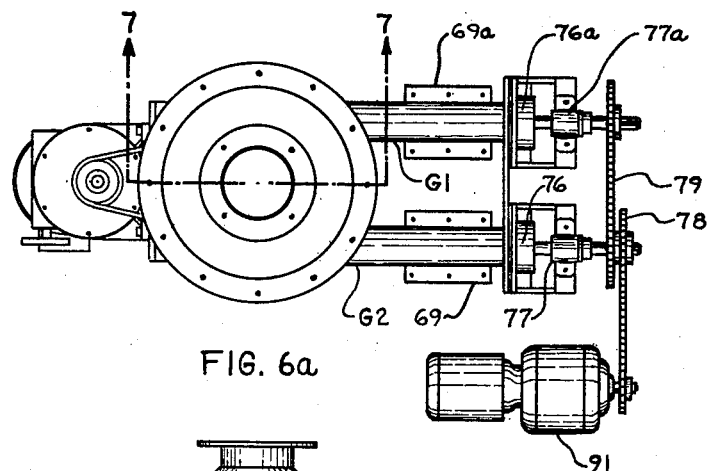
Figure 6:
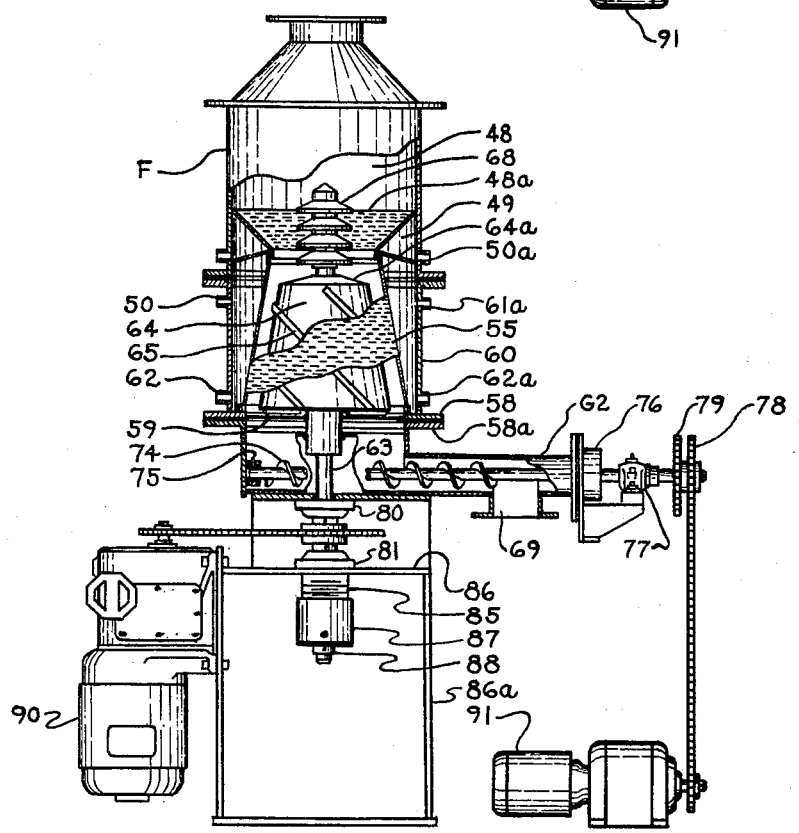
Figure 7:
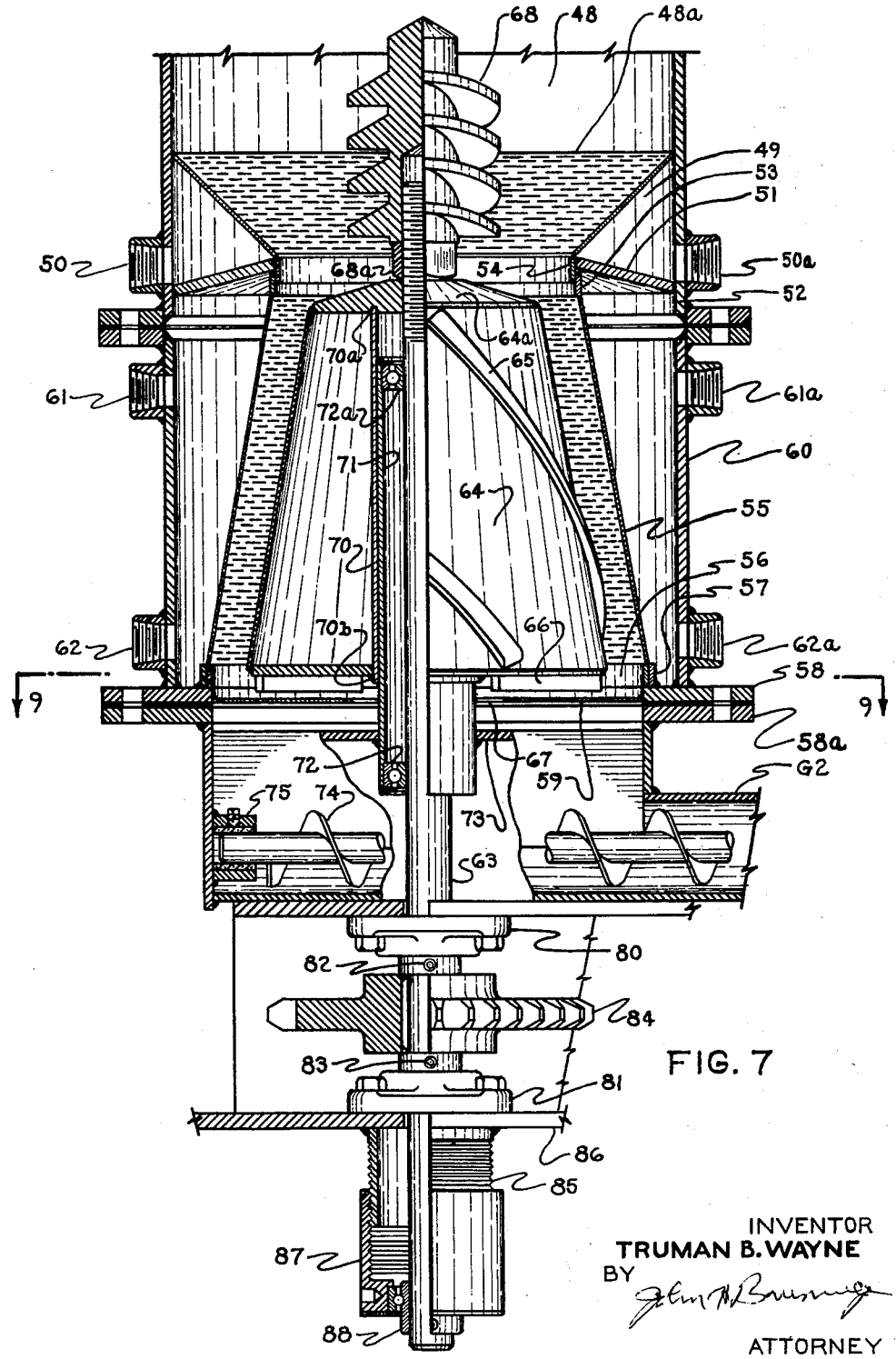
Figure 9:
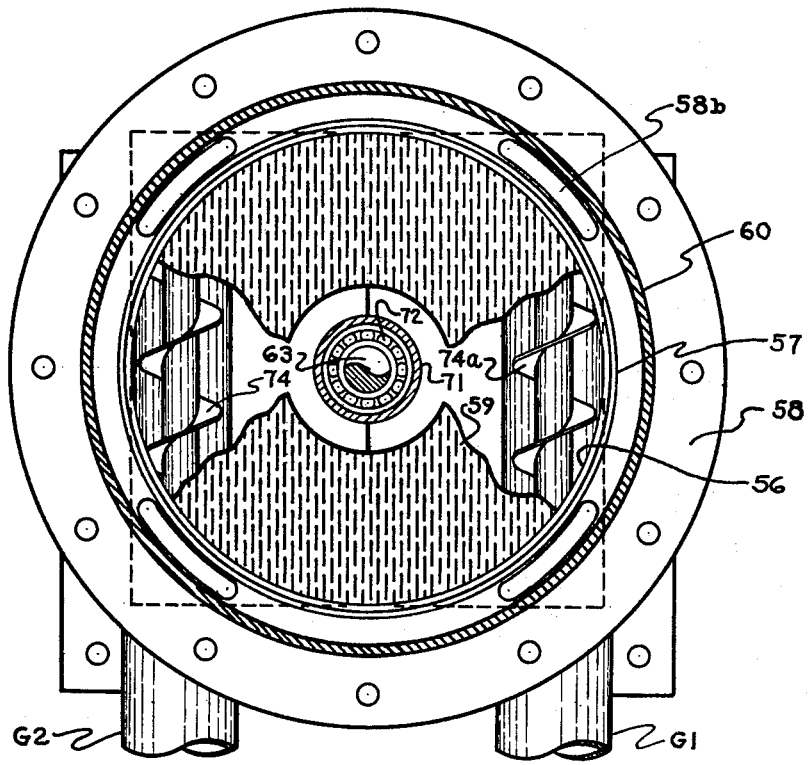
Figure 8:
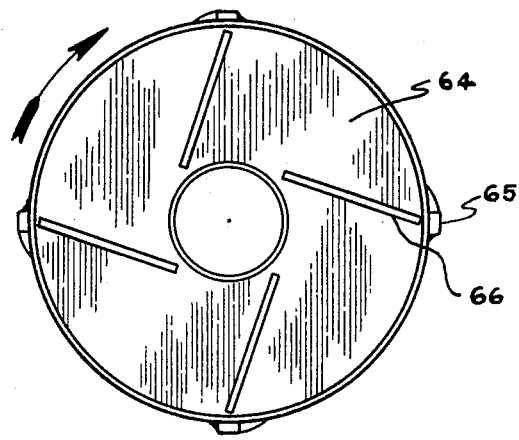

In the drawings:
FIG. 1 is a complete assembly of one embodiment of this invention.
FIG. 2 is a somewhat enlarged sectional view through the top-driven, vertical milling apparatus illustrated in FIG. 1; and
FIGS. 3 and 3a illustrate, respectively, elevation and bottom end views of the ribbed rotor.
FIG. 4 illustrates the perforated screen stator surrounding the rotor; and
FIGS. 5 and 5a illustrate, respectively, plan and sectional views of the bottom section which houses the lower bearing, bearing support and also the lower, horizontal screen section, 5a being taken on line 5a—5a, FIG. 5.
FIG. 6 is illustrative of a second embodiment of the invention partly in section comprising a bottom-driven, vertical mill complete with twin discharge conveyors, variable speed conveyor drive, and variable speed drive for the mill rotor; and
FIG. 6a is a plan view of FIG. 6 showing the relative positions of the twin discharge conveyors, mill rotor and conveyor variable speed drives.
FIG. 7 is an enlarged cross sectional view on the line 7—7, FIG. 6a, partly in section of the bottom-driven, vertical milling apparatus of FIG. 6; and FIG. 8 is a bottom end view of the ribbed rotor of said apparatus showing the central shaft opening and the lower ribs which revolve over the horizontal screen; and FIG. 9 is a cross sectional view on the line 9—9, FIG. 7, partly in elevation of the apparatus showing constructional features to be hereinafter more fully described.

Reference is made herein to bran softening or loosening agents used in pretreatment of the brown rice before either dry milling or wet milling with extractive solvents, and also to the use of extractive solvents such as are disclosed in applicant's copending applications, Serial Numbers 43,351 and 81,969. These copending applications show that suitable bran softening agents may be a vegetable oil such as the rice oil extracted as described in the above referenced applications, or any other vegetable oil such as cottonseed oil, corn oil which in their refined states are known as edible oils suitable for human consumption. Highly refined mineral oils are also suitable when used in the small proportions contemplated in the present and above referenced applications. Other approved oil soluble or oil emulsifiable substances such as food humectants, emulsifiers, etc., for instance, propylene glycol and fatty acid esters thereof, sorbitol, citric acid and various non-toxic hydroxy, carboxy and amido compounds which will wet and penetrate the somewhat oily bran layers, may be used either with or without solvent extraction. The above mentioned copending applications show that suitable extractive solvents are alcohols, ethers, petroleum hydrocarbons such as hexane, heptane, etc., and the various chlorinated hydrocarbons such as ethylene dichloride, dichlorethyl ether, trichlorethylene and others which are characterized by their ability to extract the fatty components from the germ and the bran coat.

Specifically stated, FIG. 1 comprises a top-driven, vertical milling apparatus together with its drive, variable speed discharge conveyor and solvent settling and recirculation tank complete with auxiliaries such as pumps, piping, valves and strainers. As will be understood from the descriptions which follow, FIG. 1 is illustrative both of the major features of one embodiment of the milling apparatus, proper, and its method of use. Other embodiments of the invention having somewhat different constructional details, but still conforming to the same basic features, are hereinafter disclosed in other drawings and descriptions. They, likewise, may be assembled with the complementary and/or auxiliary equipment to provide assemblies which in principle, although not in complete detail, conform with the features of FIG. 1. The descriptions of operational principles hereinafter given for the assembly in FIG. 1 likewise apply to similar assemblies which incorporate other embodiments of the milling apparatus. Also, it should be understood that any embodiment of this vertical milling apparatus may be mounted above its discharge conveyor without solvent settling and recirculation tank, pumps, piping and connections for use in a dry milling procedure either with or without the use of a bran coat softening and/or loosening agent. In such case, the removed bran is either allowed to discharge with the milled rice or is separately blown or aspirated from the apparatus by means of a carrier air stream, as hereinafter described.

Referring to FIG. 1, the apparatus comprises an assembly of components of any convenient size in which the top-driven, vertical mill A, and the discharge screw conveyor B comprises the components for either wet, solvent extraction milling or dry milling of brown rice with or without the use of a dry milling additive, respectively. The auxiliary components represented by the solvent settling and recirculation tank C and pumps D and E are shown for the purpose of illustrating the method of using the top-driven, vertical milling apparatus as an apparatus component of solvent extraction milling processes. Obviously, the milling apparatus, proper, of FIG. 1 may be used without the inclined screw discharge conveyor B, and a horizontal screw discharge conveyor or other equivalent positive discharge device may be substituted therefor when the mill discharges directly into an apparatus designed to conduct a subsequent operational step of a process such as, for examples, solvent extraction apparatus and a vertical, basket-type solvent extractor, or where dry milling is practiced. In the latter instance, the dry bran and rice may be separated by means of an aspirator, blower or other air separation device or by means of screens, centrifugal devices, etc.

Apparatus A of FIG. 1 comprises a hopper 1 superimposed above milling section 2 comprising a casing or shell 29, which is located above receiving hopper 3 which discharges by means of chute 4 into helicoid screw conveyor B. The latter consists of outer tubular casing 5, helicoid screw 6, discharge chute 7, drive sprocket or sheave 8 which is driven by chain or V-belt 9 from variable speed motor reducer driver 10. Apparatus A is driven by motor 11 through variable pitch drive sheave 12, belt 13 and driven sheave 14 which propels shaft 16 through gear reducer 15. The speed of driven sheave 14 is varied by moving motor 11 inward or outward on its mounting bracket 17 and then locking it into position by means of nuts on the threaded upper bracket prong 17a. When moved outward, belt 13 fits deeper into the expansible groove of variable pitch sheave 12 and this reduces the effective diameter of the driver sheave and causes a reduction in the r.p.m. of shaft 16. The reverse effect is obtained by moving motor 11 inward. While the illustrated drive arrangement is simple, inexpensive and quite satisfactory, other variable speed drive arrangements are contemplated as equivalents thereof.

Referring to FIG. 1 and for details additionally to FIGS. 2, 3, 3a, 4, 5 and 5a there is attached to shaft 16 by means of a suitable key, keyway and set screws a tapered conical rotor 18 on which are provided by welding, or by casting and machining a minimum of four curved rigid ribs 19 which are adapted to press and scour masses of brown rice in relatively thin cross section against perforate screen 20 while revolving in clockwise direction. Clockwise rotation is the preferred method because of the retarding action of the upward curved ribs on the downward travel of the mass which tend to increase the retention time and agitation of the kernels and produces a higher degree of milling. However, counterclockwise rotation may be used since the retention time is determnied largely by the rate of withdrawal by means of screw conveyor B, but this usually results in more breakage of whole grains and increased power requirements because of the downward, packing effect of the backward curved ribs under counterclockwise rotation.

Attached by welding, or provided by casting and subsequent machining, to the base of rotor 18 are a number of scraper ribs 21 which coincide at the perimeter of the rotor with the termini of the essentially vertical ribs 19 on the surface of the said rotor 18 as shown in the sectional view in FIG. 3a. These ribs rotate at essentially the same range of clearances over fixed, horizontal screen 22 which serves the dual function of preventing the falling through of unmilled grain from the annulus formed between rotor 18 and perforate screen 20, and adding somewhat to the overall milling result by causing a change of direction of the grain so that it must pass between rotor ribs 21 and screen 22. However, rotor ribs 21 and screen 22, while contributing to the overall efficiency of the milling action, are not an indispensable feature of the overall design of milling apparatus A, and may be omitted without departure from the principles of this invention.

The milled rice travels in a downward direction through the circular opening 26 in screen 22 between the revolving shaft 16 and screen 22, thence through housing 25 past lower shaft bearing 23, bearing support bracket 24 and into conveyor hopper 3 from which it enters discharge screw conveyor B by means of chute 4. The speed of its travel out of the milling zone is regulated by the r.p.m. of helicoid screw flight 6 as determined by the speed regulation of motor reducer 10. The rice, therefore, travels downward in a relatively compacted, dense mass as the result of the downward pressure exerted by the head pressure in hopper 1, and its resultant downward travel between the rotor 18 and the perforated screen 20 despite the tendency of the ribs 19 to exert a lifting and turning effect. Also, the discharging effect of bottom rotor ribs 21 contributes to the substantially solid downward movement of the milled products after passing through circular opening 26.

As previously stated, conveyor B is placed in an inclined position when it is desirable to maintain a solvent level in milling apparatus A when practicing countercurrent solvent extraction milling, but may be located in a horizontal position when practicing either concurrent solvent extraction milling and discharging from spout 7 into other extraction process apparatus, or dry milling when discharging into other conveying equipment or into separations apparatus such as air classifiers, aspirators, blowers, screens or centrifugal separators.

Referring to FIG. 4, the perforate screen stator 20 which surrounds rotor 18, and between which any desired overall clearance is maintained between the ribs 19 of said rotor and the perforate screen ranging between a practical maximum of $7/16''$ and a minimum of $3/16''$, is welded or otherwise suitably attached to upper imperforate funnel section 20a which by means of flange 20b is bolted between the lower flanged section of hopper 1 and the upper flange of milling section 2. The flared lower end of stator 20 terminates in circular ring support 20c which nests into the depressed circular area circumscribed by ring 27, FIG. 2, to which is attached screen 22, and thus the perforate screen stator is firmly held in exact position to maintain an annulus between it and ribbed rotor 18. This annulus may be varied by loosening recessed set screws 28 and 28a, FIGS. 2 and 3, and moving the rotor 18 up or down on shaft 16 to form the desired annulus, and then retightening the set screws. Since considerable vertical movement is required to effect small changes in the width of the annulus, it is desirable to avoid sacrifice of stator screen area by originally fitting the rotor and stator at a mean distance to afford an annulus of approximately $5/16''$ and then adjusting only sufficiently to provide a range of approximately $1/8''$ in either direction. This provides sufficient adjustment range to take care of the normal range of rice grain sizes, but other clearance ranges may similarly be provided to accommodate newly developed rice varieties having smaller or larger grain sizes or for other oil bearing seeds or cereal grains which may have their oil bearing or other external portions milled from the main body of the kernel in applicant's apparatus; viz. the "pearling" of barley, etc.

The choice of perforate screen material for stator 20 is important. Generally, wire cloth or perforated sheet metal having round or square holes of $1/16''$ diameter or smaller are unsatisfactory for the reason that the pointed ends of the rice kernels become fixed in these openings and are broken off by the moving mass. Openings of long oblong or rectangular shape are suitable because should kernel ends point through them they have an opportunity to become disengaged without breakage when the kernels are pushed over to a position roughly paralleling the opening. Also, the long slots provide more edges which scour the bran coat from the kernels. Perforated metal of abrasion resistant alloys such as Type 316 stainless steel or like materials having slot perforations ranging from 0.024″ to 0.049″ width x ½″ side stagger and ranging between ⅛″ and 5/32″ centers are suitable, the actual selection of perforations being determined largely by mill throughput requirements, breakage tolerances and the rice varietal characteristics. Generally, perforations ranging from 0.031 to 0.040 x ½″ side stagger on 5/32″ centers are used, although when milling rice of preponderantly short, thick grained characteristics, perforations of from 0.040″ to 0.049″ slot diameters x ½″ side stagger on 5/32″ centers may be used without causing excessive breakage such as would occur with varieties having longer grained, thinner cross section kernels.

In operation the brown rice with its bran coat enters the space between the perforated screen and the ribbed rotor. The rotor is revolved at a speed sufficient to direct the rice against the screen with force sufficient and in a manner to remove bran from kernels of the rice. The helical ribs 19 retard downward movement of the rice as described, to an extent sufficient to secure the desired result.

The bran coat is partially removed by abrading the whole brown rice kernels between themselves, but mainly between the revolving ribbed rotor 18 and the perforate screen stator 20 in a manner to remove the bran from the whole kernels. The bran remains partially in the annulus between the rotor 18 and the screen stator 20, but much of it passes through the screen perforations and collects in the outer annulus between screen stator 20 and the outer shell 29, FIGS. 1 and 2, from which it progressively moves downward by gravity, if obtained from dry milling, through the series of slots 30 in ring 27 best shown in FIGS. 2 and 5 into the bearing housing 25 where it joins the main mass of milled rice and bran and progresses out of the apparatus as above described. An alternate method of bran removal is to attach a blower or aspirator to either pipe coupling 42 or 42a to remove bran which has passed through perforate screen stator 20. Approximately one half of the bran may thus be recovered separately from the main stream of milled products.

If the bran is removed under solvent milling operation of the apparatus it is removed largely through slots 30 by the flushing effect of the solvent stream, although a portion of it remains in the solvent and rises with it through feed hopper 1 and is removed and discharged into the brown rice by means of rotary disc filter 31, FIG. 1, which passes the solvent containing only a minor proportion of fines into pipe 32 which discharges into settling and recirculation tank C. The solvent in pipe 32 enters tank C at pipe coupling 33 and travels downward and passes under vertical baffle 34 and then upward between stagered baffles 34a, 34b and 34c. The bran settles into the cone of tank C and is removed through valve 35 by sludge pump E and is pumped through pipe 36 which by means of branch pipes 36a, 36b and 36c, each of which is provided with suitable valves to direct the flow all in one direction or may divide it between the several points indicated in FIG. 1. For instance, by closing valves 37b and 37c, and opening valve 37a, all of the bran slurry may be directed through pipe 36a to other process operations for bran recovery by resettling and filtration. Alternately, by closing valve 37a the slurry may be directed either to conveyor B or to hopper 1 of milling apparatus A, or by suitable manipulation of valves 37b and 37c may be divided between these points.

The clarified solvent in tank C after traversing the series of baffles has deposited most of its bran suspension. Most of any remaining bran in suspension is removed by disc filter 38, FIG. 1, which filters out the bran particles of sizes above approximately 5 microns and drops them as compressed larger platelets back into tank C. The clarified solvent leaving disc filter 38 flows through pipe 39 to pump D which forces it through pipe 40 and valve 41 into either pipe 40a and valve 41a or alternately into pipe 40b and valve 41b. The stream may be divided and proportioned between pipes 40a and 40b by suitable manipulation of valves 41a and 41b. Solvent passing through pipe 40b and valve 41b reenters the solvent extraction operation in apparatus A as a recycled stream whereas that passing through pipe 40a and valve 41a is directed to other apparatus in the process scheme or to solvent and rice oil separation and recovery operations, but which are not generally part of the present invention.

The above described solvent flow plan through the apparatus applies to a countercurrent extraction operation. By reversal of the points of entry and exit of the solvent from apparatus A a concurrent extraction operation may be had. In such case, disc filter 31 would be eliminated and its connection point to hopper 1 reoriented through 180° and used as the point of entry for a lengthened pipe 40b. Also pipe coupling 42 would be reoriented through 180° and joned to a shortened pipe 32 which would still enter tank C at pipe coupling 33. The disposal of bran slurry removed by pump E from tank C would not be altered by the change from countercurrent to concurrent operation of the apparatus. Alternately, the solvent may enter milling section 2 of apparatus A through a coupling 42a located as shown on FIGS. 1 and 2 by means of pipe 40b thus relocated, and exit through pipe coupling 42 through relocated pipe 32. When not in use, coupling 42a is closed with a pipe plug.

As a second alternate, disc filter 31 may be eliminated and its entry point blanked. Pipe 32 is then joined to milling section 2 through pipe coupling 42a for countercurrent operation which delivers the solvent with its bran suspension to tank C through pipe coupling 33. This form of operation without disc filter 31, as is also the case where concurrent operation such as described in the preceding paragraph is practiced, diverts a larger proportion of the bran to the solvent settling and recirculation tank C instead of retaining it within the milling apparatus for final discharge through chute 4 into conveyor B. Of course, where total discharge of milling products and solvent is directed into a further extraction step before separation of solids and solvent is made, the solvent supply would for concurrent extraction enter at pipe coupling 42a and discharge through pipe coupling 42 into the succeeding apparatus. For countercurrent extraction, the course of the solvent would be reversed. Part of the solvent in each case would be discharged with the milling products through discharge chute 4.

Capped opening 43, FIG. 1, is used for filling hopper 1 with grain to be milled.

Valved connection 44, FIG. 1, is adapted to solvent additions to the system, particularly when further solvent extraction steps are not employed and a final solvent rinse of the milled products in conveyor B is required.

Pipe assembly 45, FIG. 1, which is inclusive of several pipe fittings, valve 46 and pipe strainer 47 are used only when liquidating the milling apparatus A and inclined conveyor B of solvent when discontinuing operation to clean out or to change from one rice variety to another, etc.

A second embodiment of the present invention is shown in elevation in FIG. 6 partly in section, and in plan in FIG. 6a. FIG. 6 shows a sectional view through the apparatus to expose essential mechanical parts. Likewise, FIG. 7 is an enlarged sectional view to illustrate constructional features not fully shown in FIGS. 6 and 6a. FIG. 8 is a plan of the rotor and FIG. 9 a section on 9—9, FIG. 7.

In FIGS. 6 and 6a, apparatus assembly F is a complete bottom-driven vertical mill with its twin, variable speed, withdrawal conveyors G1 and G2. Auxiliary components such as piping, valves, pumps, etc. are not again shown and described, as this has been done in full for the assembly in FIG. 1, and it is to be understood that vertical mill F and its withdrawal conveyors G1 and G2 may be used in such assembly in identical manner. The only point of difference is the presence of twin horizontal screw conveyors for removing the products of the milling operation instead of a single inclined conveyor such as conveyor B. However, this is inconsequential since it has been previously stated that a horizontal conveyor may be used with vertical mill A of FIG. 1 and that the reason for inclining the withdrawal conveyor B is so that a solvent level may be carried within vertical mill A. If the mill is discharging into additional extraction apparatus, both the milling products and the solvent may be discharged from a horizontally placed conveyor into such succeeding apparatus. Likewise, vertical mill F may through its withdrawal conveyors G1 and G2 discharge in like manner. Also, conveyors G1 and G2 may discharge through their chutes 69 and 69a into an inclined conveyor and thus maintain a solvent level within vertical mill F.

Apparatus assembly F of FIGS. 6 and 7 comprises a hopper 48 provided with conical top and perforate conical bottom 48a through which solvent may pass to or from solvent well 49, this depending on whether pipe couplings 50 and/or 50a are used to drain away solvent in countercurrent operation or to admit solvent in concurrent operation. The perforations in the conical hopper bottom 48a are the same as those used in the screen stator. Below the perforate bottom, and forming a solid bottom for solvent well 49 is conical ring 51 welded or pressed to a substantially leak proof fit to the outer shell 52. Conical ring 51 also forms a rigid support for ring 53 which serves as a positioner and upper support for ring 54 which is attached to the upper end of perforate screen stator 55 which also has another ring 56 at its base which is adapted to make a slip-in fit into ring 57. The latter is welded to upper flange 58. Also attached by any suitable means to upper flange 58 is perforate metal bottom screen 59. In outer shell 60, which is welded to upper flange 58, are two pairs of pipe couplings 61 and 61a, and 62 and 62a. The upper pair, or any one of them may be used instead of pipe couplings 50 and 50a as solvent input or output connections, this depending on whether solvent flow is concurrent or countercurrent with respect ot the downward flow of the brown rice. Likewise, either or both of lower pipe couplings 62 and 62a may be used as solvent flow connections for concurrent or countercurrent operation. The slurry of bran in solvent which accumulates within the annulus formed by screen stator 55 and outer shell 60, and which is not flushed out through the above referenced pipe discharge couplings, drains into the hoppers of conveyors G1 and G2 through a series of slotted openings 58b provided through flange 58. (See FIG. 9).

To shaft 63 is attached ribbed rotor 64, FIGS. 6, 7, 8, on which is provided by forming and welding, or by casting integrally with said rotor and machining, a series of four curved ribs 65 which operate within conical screen stator 55 in substantially the same manner as those previously described for vertical mill A of FIGS. 1 and 2. Likewise, bottom ribs 66, screen 59 and the opening 67 in screen 59 are provided and function as previously described. Above rotor 64 on shaft 63 is a spiral screw feeder 68 provided with internal threads engaging the upper part of shaft 63 which adapts it to the dual purposes of a feed screw for the brown rice entering the milling zone. Since the clearance between feed screw 68 and the throat at 54 of the conical hopper section 28a is large, the feed screw arrangement is not of positive delivery type. It is effective, however, to maintain pressure on rice in hopper 48a, tending to move the rice downward into the annular space between rotor 64 and screen 55. A lock nut 68a locks the rotor on shaft 63. The upper end of rotor 64 is provided with threaded cap 64a which affords a means of positioning the rotor on shaft 63.

Rotor 64, if of cast construction, is drilled to provide a circular hole of accurate bore circumscribing its centerline through from its base to the upper integral threaded cap 64a. If rotor 64 is of fabricated construction as indicated in FIG. 7, a tubular member 70 of accurate bore diameter is inserted through its center and is anchored in a circular, milled groove 70a in cap 64a, and is also continuously welded to the bottom of rotor 64 at point 70b. In either case the inside bore diameter of the central hole through rotor 64 is the same in order that it may serve as a closely fitted, outer sleeve which may rotate around fixed tubular member 71 which houses shaft bearings 72 and 72a, and through which shaft 63 revolves. The above described assembly provides close clearance bearing surfaces between the inner wall 70 and the outer wall of fixed tubular member 71. Since rotor 64 and its threaded cap 64a and feed screw 68 are rigidly joined to shaft 63, the position of the complete rotor and shaft assembly may be raised or lowered within fixed tubular member 71 and bearings 72 and 72a which are pressed into the lower and upper extremities of fixed tubular member 71. Tubular member 71 and shaft 63 are centrally located between the two discharge conveyors G1 and G2 (See FIGS. 6a and 9 for orientation) and the lower extremity of tubular member 71 and bearing 72 protrude through the bottom of apparatus F between conveyors G1 and G2. Tubular member 71 is fitted through and welded to an opening in steel web 73 which bridges between the top flanges of the troughs of conveyors G1 and G2.

While the shaft, rotor and feed screw assembly above described are provided with two additional anti-friction bearing supports 72 and 72a along the shaft 63, and the construction thus shown eliminates the need for a rotary mechanical seal on the shaft where it goes through steel web 73, it is possible to eliminate tubular members 70 and 71; bearings 72 and 72a; and instead key rotor 64 to shaft 63 and provide a rotary mechanical seal where shaft 63 passes through steel web 73. However, because of the heavy, rotating rotor which rotates at speeds up to 600 r.p.m., it will then be necessary to provide an additional bearing adjacent to the mechanical seal at point 73.

Shaft 63 operates through anti-friction bearings 80 and 81 and is supported at its lower end in anti-friction thrust bearing 88. Shaft 63 and all attachments may be raised or lowered by loosening set screws 82 and 83 in the hubs of sprocket or sheave 84 and raising or lowering the entire shaft assembly inclusive of rotor 64 and feed screw 68 by screwing up or down, respectively, on threaded bearing support 87 which has internal threads adapted to raise it on threaded tubular piece 85 which is securely attached to the top plate 86 of a frame support 86a for the complete shaft assembly. The entire shaft assembly is driven by variable speed motor drive 90 through a sprocket and chain to the sprocket 84. Alternately, the drive may comprise sheaves and V-belts. Also, a splined shaft through sprocket or sheave 84 may be employed to allow raising or lowering the shaft assembly without the necessity for set screws 82 and 83.

Screw conveyors G1 and G2 are provided with U-troughs which form a hopper which attaches by means of flange 58a to flange 58 of apparatus F. This hopper has an inverted V-shaped center formed by adjacent sides of the two U-troughs, and through which the lower shaft assembly of apparatus F extends. Other parts of the conveyor assemblies are screw flights 74 and 74a, FIGS. 6, 7 and 9, and bearings 75, 77 and 77a and liquid retaining mechanical seals or stuffing boxes 76 and 76a. Variable speed drive 91 drives both the flights of conveyors G1 and G2 through sprocket and chain assemblies 78 and 79. A speed variation of 5 to 1 obtainable through variable speed drive 91 is sufficient at conveyor speeds ranging from 3 to 15 r.p.m. for conveyor discharge capacities which are properly synchronized with a suitable range of milling rates by apparatus F. Milling products are discharged through spouts 69 and 69a to succeeding apparatus such as, for example, a screw conveyor, rotary screw lift or directly into the feeder of another stage of solvent extraction.

It is to be understood that the principles of this invention may be utilized for the surface milling and/or solvent extraction of products other than rice and other cereal and oil bearing seeds.

The applicant has in the drawings and specification presented a detailed disclosure of two embodiments of his invention, but it is to be understood that as the invention and the mechanical features are susceptible of modifications, structural changes, the use of alternate devices as components of the whole apparatus and various applications of use within the spirit and scope of the invention, he does not intend to limit the invention to the specific form disclosed but intends to cover all modifications, changes and alternate constructions and methods falling within the scope of the principles taught herein, and within the appended claims.

Having thus described the invention, what is claimed, and desired to be secured by Letters Patent is:

1. An apparatus for milling brown rice comprising a casing; a stationary frusto-conical screen mounted vertically within the casing and spaced laterally therefrom; a frusto-conical rotor within and concentric with the screen having a smooth surface substantially parallel to the screen defining an annular space between the rotor and screen effective to mill bran from brown rice; an inlet for brown rice into said annular space adjacent the upper end of the screen; a horizontal screen below said rotor defining a horizontal space below said rotor substantially equal in height to the width of said annular space and communicating with said annular space; a central outlet for milled rice in said horizontal screen; scraping ribs on the bottom of the rotor arranged to sweep grains from said horizontal space to said outlet; and means, including rigid spiral ribs on the rotor arranged to oppose downward flow of grains through the annular space and to direct such grains outward against said frusto-conical screen, for retarding downward flow of grains in said annular space.

2. An apparatus for milling brown rice comprising a casing; a stationary frusto-conical screen mounted vertically within the casing and spaced laterally therefrom; a frusto-conical rotor within and concentric with the screen having a smooth surface substantially parallel to the screen defining an annular space between the rotor and screen; an inlet for brown rice into said annular space adjacent the upper end of the screen; an outlet for milled rice from said space adjacent the lower end of the screen; means, including rigid spiral ribs on the rotor arranged to oppose downward flow of grains through the annular space and to direct such grains outward against the screen for retarding downward flow of grains in said annular space; a horizontal ring disposed across said casing in contact with the lower end of the screen, said ring having a large central opening fitting upon the lower end of said frusto-conical screen and a series of slots between the screen and outer wall of the casing adapted to pass bran downward from a space between the screen and casing.

3. An apparatus for milling brown rice comprising a casing; a stationary frusto-conical screen mounted vertically within the casing and spaced laterally therefrom; a frusto-conical rotor within and concentric with the screen having a smooth surface substantially parallel to the screen defining an annular space between the rotor and screen effective to mill brown rice; a hopper connected to the casing at a level above said rotor and communicating with an upper part of said annular space; a screw connected to the rotor and located in said hopper and widely spaced therefrom adapted to agitate grains in said hopper and tend to move grains downward into said annular space; an outlet for milled rice from said annular space adjacent the lower end of the screen; spiral ribs on the rotor arranged to oppose downward flow of grains through the annular space and to direct such grains outward against said screen; and positive feed conveyor means cooperative with said outlet to remove grains from said casing at controlled rate and cooperative with the ribs to maintain back pressure on grains in said annular space.

4. An apparatus for milling brown rice comprising a casing; a stationary frusto-conical screen mounted vertically within the casing and spaced laterally therefrom, said screen having slot perforations about ½ inch long and of width in the range from about 0.024 to 0.049 inch, the slots being side staggered on ⅛ to 5/32 inch centers and having their length horizontal; a frusto-conical rotor within and concentric with the screen having a smooth surface substantially parallel to the screen defining an annular space between the rotor and screen; means for adjusting the rotor vertically through a distance providing width of said annular space between the rotor and screen in the range from about 3/16 inch to about 7/16 inch; an inlet for brown rice into said annular space adjacent the upper end of the screen; an outlet for milled rice from said space adjacent the lower end of the screen; and means, including rigid spiral ribs on the sides of the rotor, directing grains of brown rice flowing downward through the annular space upward and outward against said screen, for retarding downward flow of grains in the annular space.

References Cited by the Examiner

UNITED STATES PATENTS

| | | | |
|---|---|---|---|
| 63,320 | 3/67 | Southworth | 146—300 X |
| 283,480 | 8/83 | Gathmann | 146—281 X |
| 348,890 | 9/86 | Crawford | 146—279 X |
| 403,389 | 5/89 | Seck | 146—279 X |
| 807,551 | 12/05 | Gordon | 146—126 |
| 1,131,526 | 3/15 | Kleiser | 146—279 |
| 2,329,403 | 9/43 | Logue. | |
| 2,379,184 | 6/45 | Rakowsky et al. | |
| 2,641,797 | 6/53 | Waltman. | |
| 2,829,055 | 4/58 | Ozai-Durrani | 99—80 |

FOREIGN PATENTS 539,303  11/31  Germany.

J. SPENCER OVERHOLSER, *Primary Examiner.*

CARL W. ROBINSON, *Examiner.*

UNITED STATES PATENT OFFICE
CERTIFICATE OF CORRECTION

Patent No. 3,165,134                                      January 12, 1965

Truman Benjamin Wayne

It is hereby certified that error appears in the above numbered patent requiring correction and that the said Letters Patent should read as corrected below.

In the grant, lines 1 to 3, for "Truman Benjamin Wayne, of Houston, Texas, assignor to Food Engineering International, Inc., of Houston, Texas, a corporation of Texas," read -- Truman Benjamin Wayne, of Houston, Texas, --; line 12, for "Food Engineering International, Inc., its successors" read -- Truman Benjamin Wayne, his heirs --; in the heading to the printed specification, lines 3 to 5, for "Truman Benjamin Wayne, Houston, Tex., assignor to Food Engineering International, Inc., Houston, Tex., a corporation of Texas" read -- Truman Benjamin Wayne, P. O. Box 13086, Houston, Texas 77019 --.

Signed and sealed this 28th day of November 1967.

(SEAL)
Attest:

EDWARD M. FLETCHER, JR.                          EDWARD J. BRENNER
Attesting Officer                                    Commissioner of Patents